United States Patent [19]

Coquard et al.

[11] Patent Number: 4,680,379
[45] Date of Patent: Jul. 14, 1987

[54] HOMOGENEOUS COPOLYAMIDE COMPRISED OF HEXAMETHYLENEDIAMINE/ADIPIC ACID/SHORT CHAIN DIACID/DIMER ACID AND CATALYTIC PREPARATION THEREOF

[75] Inventors: Jean Coquard, Craponne; Jean Goletto, Ecully, both of France

[73] Assignee: Rhone-Poulenc Specialties Chimiques, Courbevoie, France

[21] Appl. No.: 826,926

[22] Filed: Feb. 7, 1986

[30] Foreign Application Priority Data

Feb. 7, 1985 [FR] France ................................ 85 01912

[51] Int. Cl.$^4$ ........................ C08G 69/34; C08G 69/04
[52] U.S. Cl. .................................. 528/336; 528/339.3; 528/339.5
[58] Field of Search .................. 528/339.3, 336, 339.5

[56] References Cited

U.S. PATENT DOCUMENTS 3,329,633 7/1967 Crovatt ............................. 528/339.3
4,384,111 5/1983 Goletto et al. .................... 528/339.3

Primary Examiner—Harold D. Anderson
Attorney, Agent, or Firm—Burns, Doane, Swecker & Mathis

[57] ABSTRACT

Homogeneous, high melting, flexible copolyamides, adopted as molding compositions and for textile applications, are conveniently prepared by (a) prepolymerizing either (i) mixture of adipic acid and hexamethylenediamine, or admixture thereof with at least one other short-chain dicarboxylic acid, or (ii) mixture of (1) a salt of adipic acid, or salt of admixture of adipic acid with at least one other short-chain dicarboxylic acid, and hexamethylenediamine, together with (2) free hexamethylenediamine, said prepolymerization (a) being carried out in the presence of a catalytically effective amount of a strong inorganic oxyacid, or strong organic oxyacid other than a carboxylic acid, or alkali or alkaline earth metal thereof, said resulting prepolymer having amino end groups, and thence (b) polycondensing said prepolymer with a fatty acid dimer.

21 Claims, No Drawings

HOMOGENEOUS COPOLYAMIDE COMPRISED OF HEXAMETHYLENEDIAMINE/ADIPIC ACID/SHORT CHAIN DIACID/DIMER ACID AND CATALYTIC PREPARATION THEREOF

BACKGROUND OF THE INVENTION

1. Field of the Invention

The present invention relates to the preparation of homogeneous copolyamides having both high melting points and good flexibility, and, more especially, to the preparation of such homogeneous copolyamides from hexamethylenediamine, adipic acid by itself or admixed with at least one other short-chain dicarboxylic acid, and a fatty acid dimer, the amount of short-chain diacid(s) relative to the total amount of the acids present [short-chain acid(s)+dimer acid] ranging from 50 to 99 mole %.

2. Description of the Prior Art

Copolyamides of the aforesaid type, based on hexamethylenediamine, adipic acid and dimer acid, are known to this art and are described in French Pat. No. 2,459,810, assigned to the assignee hereof. By "homogeneous copolyamide" there is intended a copolymer which forms only a single phase in the melt state, or a single amorphous phase in the solid state, as can be determined, for example, by scanning electron microscopy which reveals any dispersed phase which may be present via fixing with phosphotungstic acid.

A much simpler means for determining this homogeneity consists of observing the state of transparency of, on the one hand, a melt having a thickness of approximately 0.2 to 0.5 cm, heated at a temperature at least 10° C. above its melting point and, on the other hand, a small-diameter rod or film obtained from this melt after rapid cooling, for example, by immersion in water at ambient temperature. An absolutely transparent rod or film indicates perfect homogeneity of the polymer; when the film is greater in thickness or when the cooling has been slower, a translucent zone may be the sign of some degree of crystallinity; a white film incorporating streaks or inclusions (fisheyes, for example) is the sign of a major heterogeneity. This homogeneity underlies the fact that the copolymers in question have thermomechanical properties which can be readily reproduced, in addition to good transparency. By a "copolymer having good flexibility" there is intended a copolyamide whose flexural modulus is significantly lower than that of the conventional polyamides such as polyhexamethyleneadipamide (nylon 66) or polycaprolactam (nylon 6) and is on the order of, or lower than, that of the polyamides considered to be flexible such as, for example, polyundecanamide (nylon 11).

In copolyamides of this known type, the crystallinity and, consequently, the ability to obtain high melting points and good thermomechanical properties are essentially contributed by the group of segments which are derived from the condensation of the short-chain acid molecules (adipic acid) with a part of the hexamethylenediamine molecules. The ability to have flexibility and good elasticity is substantially contributed by the group of segments which are derived from the condensation of the fatty acid dimer molecules with the other part of the hexamethylenediamine molecules. It is self-evident that, by changing the amount of short-chain acid relative to the total amount of the acids present in the range from 50 to 99 mole %, copolyamides are obtained whose melting points will be more or less high and whose flexibility will be greater or lesser. The copolyamides in which the amount of short-chain acid is in the range from 70 to 90 mole % are of particular interest because they have both high melting points and excellent flexibility.

Several specific processes which enable the preparation of such homogeneous copolyamides are also described in the aforenoted '810 French patent. According to a first process, the following steps are carried out:

(1) Prepolymers are prepared in a heterogeneous medium from a mixture of adipic acid, dimer acid and hexamethylenediamine, or the corresponding salts thereof, the amounts of the constituents of the starting mixture being such that the amount of adipic acid relative to the total acids is in the range from 50 to 99 mole % and that the contents of amino groups and of carboxylic groups do not differ by more than 5% as an absolute value, the polymerization reaction consisting of heating the starting mixture up to 270° C. in a gradual and uniform manner over a period of time ranging from 30 minutes to several hours, at a water vapor pressure of from 1.3 to 2.5 MPa, which is the chemical equilibrium state corresponding to the start of the following phase (2);

(2) A homogenization phase is then carried out for a period of time of from 0.5 to 5 hours, at a temperature of from 270° C. to 290° C. under a water vapor pressure of from 1.3 to 2.5 MPa, during which the equilibrium state of the amidification reactions is not altered; and (3) Lastly, a polycondensation is carried out such as to convert the homogeneous prepolymers thus obtained into the required copolyamides, the polycondensation reaction being carried out in a conventional manner at a temperature of from 260° to 290° C. at atmospheric pressure or at a lower pressure, for a period of time ranging from 30 minutes to several hours.

According to a second process, the following steps are carried out:

(1) Prepolymers are prepared in a heterogeneous medium from a mixture of adipic acid, dimer acid and hexamethylenediamine, or corresponding salts thereof, the amounts of the constituents of the starting mixture being such that the amount of adipic acid relative to the total acids is in the range from 50 to 99 mole % and that the contents of amino groups and of carboxylic groups differ by more than 5% as an absolute value, the prepolymerization reaction consisting of bringing the starting mixture to a temperature corresponding to the beginning of the following phase (2), in a gradual and uniform manner, over a period of time ranging from 30 minutes to several hours;

(2) A homogenization phase is then carried out for a period of time of from 10 minutes to 2 hours at a temperature of from 265° to 290° C.; and (3) Lastly, the gradual addition of the deficient reactant is carried out in a conventional manner and the polycondensation is completed at temperatures of from 260° to 290° C. at atmospheric pressure or at a lower pressure for a period of time ranging from 30 minutes to several hours until the required copolyamides are obtained.

Lastly, according to a third process, copolymers are directly prepared at a temperature of from 150° to 300° C., in a homogeneous medium, from a mixture of adipic acid, dimer acid and hexamethylenediamine, the amount of adipic acid relative to the total acids being in the range from 50 to 99 mole % and the contents of amino groups and of carboxylic groups not differing by more than 5% as an absolute value, the medium being rendered homogeneous by the use of a third solvent for the mixture of the three starting materials or of the corresponding salts and/or the oligomers of adipic acid and hexamethylenediamine and dimer acid and hexamethylenediamine having a molecular weight of below 5,000, the said solvent being inert towards the amidification reactants and reactions.

SUMMARY OF THE INVENTION

It has now been found that homogeneous copolyamides can be prepared by utilizing a process permitting independence:

(I) of the use of an intermediate homogenization step at a high temperature, which would be expected to excessively lengthen the dwell time in industrial reactors and to result prematurely in some degradation of the product copolyamides; and (II) of the use of an organic solvent, the recovery of which would be expected to give rise to additional difficulties.

Briefly, the present invention features a process for the preparation of homogeneous copolyamides having both high melting points and good flexibility, from hexamethylenediamine, short-chain dicarboxylic acid(s) and a fatty acid dimer, the amount of short-chain acid(s) relative to the total amount of the acids present being in the range of from 50 to 99 mole %, and said process being characterized by the following parameters:

(1) in a first step (a), a prepolymer having amino end groups is prepared by reacting, optionally in the presence of water, the starting materials comprising either:
(i) the mixture of the following constituents: adipic acid, optionally at least one other short-chain dicarboxylic acid of a saturated alicyclic or aromatic type, hexamethylenediamine, and a catalyst which is either an "alpha" compound or a "beta" compound, with "alpha" denoting an inorganic oxyacid or an organic oxyacid other than a carboxylic acid, at least one of the acid groups thereof, when there is several of these, having an ionization constant pKa in water at 25° C. which does not exceed 4, and "beta" denoting an alkali or alkaline earth metal salt of such acid, or
(ii) the mixture of the following constituents: stoichiometric salt(s) of the above-mentioned short-chain acid(s) with hexamethylenediamine, free hexamethylenediamine and the catalyst defined above;
said first step (a) being carried out in an optionally closed system of autoclave type by gradually raising the temperature of the starting mixture by heating to an autogenous water vapor pressure in the range of from atmospheric pressure to 3 MPa, and then by removing the water present in the reaction mixture by distillation such as to adjust the temperature of the reaction mass upon completion of this step to a value ranging from 170° to 250° C.;

(2) in a second step (b), the prepolymer thus obtained is reacted with the fatty acid dimer, such polycondensation being carried out at a temperature ranging from 250° to 280° C., at a water vapor pressure which gradually decreases from a value equal to the prepolymerization pressure to a value which can be atmospheric pressure [in the case where the step (a) is carried out under a pressure above atmospheric pressure] or a pressure below the latter [in the case where the step (a) is carried out at a pressure higher than or equal to atmospheric pressure] and for a period of time which is sufficient to produce a copolyamide having the required viscosity; and the proportions of the various constituents are such that:

(iii) the amount of short-chain acid(s) relative to the combination of short-chain acid(s)+dimer acid ranges from 50 to 99 mole %, (iv) the ratio $r_1$ of the number of moles of hexamethylenediamine employed in step (a), variant (i), relative to the total number of moles of short-chain acid(s) and of dimer acid is equal to 1 or optionally equal to a value which is higher than the stoichiometry and is determined such as to introduce into the reaction mixture an excess of hexamethylenediamine which makes it possible to compensate for the loss of this reactant which may occur in step (a) during the distillation and/or in step (b) during the decompression, and (v) the ratio $r_2$ of the number of moles of free hexamethylenediamine employed in step (a), variant (ii), relative to the number of moles of dimer acid has the value indicated above for the ratio $r_1$.

DETAILED DESCRIPTION OF THE INVENTION

More particularly according to the present invention, the pressure under discussion is always absolute pressure.

And by "water present in the reaction mixture" is intended the water which is formed during the polycondensation of the short-chain acid(s) with hexamethylenediamine, plus, if appropriate, the water initially introduced with the constituents of the reaction mixture. The amount of water which may be introduced at the outset is not critical and can vary over wide limits.

By "copolyamide of the required viscosity" is intended a copolyamide which has a sufficiently high melt viscosity as to be capable of being injection-molded or extruded in a convenient manner. More precisely, it is intended to define a copolyamide having a melt viscosity (measured under conditions which are defined hereinafter) of at least 1,500 poises and preferably of from 3,000 to 60,000 poises.

As regards the loss of hexamethylenediamine, referred to above, this can arise, for example, when the apparatus employed does not incorporate a distillation column; under these conditions, for a given apparatus and for given charges, simple methods may be used to determine the amount of hexamethylenediamine entrained during each operation and, consequently, the excess of this reactant to be introduced into the starting reaction mixture to preserve the equivalence between the amino groups and the carboxy groups which react. In general, when a loss of hexamethylenediamine occurs, it is moderate, and it has been found that the use of amounts of this reactant which result in the ratios $r_1$ and $r_2$ having values ranging from a number greater than 1 to 1.3 are suitable.

It is obvious that "short-chain acid(s)" is intended to denote adipic acid by itself or mixed with at least one other short-chain dicarboxylic acid of a saturated alicyclic or aromatic nature. More precisely, alicyclic and/or aromatic dicarboxylic acids which are within the scope of the present invention are compounds containing at most 12 carbon atoms; 1,4-cyclohexanedicarboxylic acid, isophthalic acid, and terephthalic acid are representative of suitable diacids of this type. The proportion of adipic acid in the mixture of short-chain diacids which may be employed usually represents at least 70 mole %.

It is believed that during the homogenization step employed in the above-mentioned French patent, the amino and carboxy groups, which no longer undergo an amidification reaction at this time, are used to form breaks in the block oligomers of adipic acid with hexamethylenediamine and/or oligomers of dimer acid with hexamethylenediamine and that, as a result, a homogeneous random prepolymer is formed. It is also believed that in the process according to the present invention, the prepolymer formed in step (a) is in the form of a homogeneous preformed polyhexamethylene amide structure whose homogeneity, surprisingly, is not altered by the subsequent addition of dimer acid whose oligomers with hexamethylenediamine are, however, incompatible with those of the preformed polyhexamethylene amide.

The dimer acids employed are obtained by polymerization of compounds containing 80 to 100% by weight of monomeric fatty acid(s) containing from 16 to 20 carbon atoms and 20 to 0% by weight of monomeric fatty acid(s) containing from 8 to 15 carbon atoms and/or from 21 to 24 carbon atoms. By "monomeric fatty acids" are intended saturated or unsaturated, straight or branched chain aliphatic monoacids.

Among the straight-chain or branched saturated monomeric fatty acids, representative are: caprylic, pelargonic, capric, lauric, myristic, palmitic and isopalmitic, stearic, arachidic, behenic and lignoceric acids.

Among the straight-chain or branched monomeric fatty acids containing ethylenic unsaturation(s), representative are: 3-octenoic, 11-dodecenoic, oleic, lauroleic, myristoleic, palmitoleic, gadoleic, cetoleic, linoleic, linolenic, eicosatetraenoic and chaulmoogric acids. Some acids containing acetylenic unsaturation may also result in polymeric acids, but they do not occur naturally in quantities of interest and as a result their economic interest is very low.

The polymeric fatty acids obtained by thermal polymerization, in the presence of catalysts such as peroxides or Lewis acids if appropriate, may be fractioned, for example, by conventional vacuum distillation or solvent extraction methods. They can also be hydrogenated to reduce their degree of unsaturation and thus to reduce their coloration.

The dimer acids which are preferably used in the present invention are fractionated polymeric fatty acids, the difunctional acid fraction of which is greater than 94% by weight, the monofunctional acid fraction is less than 1% by weight and still more preferably does not exceed 0.5% by weight, the fraction of acid having a functionality greater than 2 is less than 5% by weight and still more preferably does not exceed 3% by weight.

Still more preferably, the dimer acids employed are those species obtained by fractionation (resulting in the fractions indicated above) of polymeric fatty acids which have additionally been subjected to hydrogenation.

The dimer acids which are most especially suitable are those species obtained by fractionation of a hydrogenated composition originating from the catalytic polymerization of monomeric fatty acid(s) containing 18 carbon atoms. In this respect, because of their ready availability of supply and their relatively easy polymerization, oleic, linoleic and linolenic acids, taken by themselves or in pairs or preferably in the form of a ternary mixture, are the starting materials which are most especially preferred for the preparation of the polymeric fatty acids.

Concerning the strong organic or inorganic oxyacid (alpha) which is employed as catalyst, use is made, as indicated above, of an oxygen-containing mono- or polyacid in which at least one of the acid groups thereof has an ionization constant pKa in water at 25° C. which does not exceed 4.

As strong acids which are suitable, representative are, for example:

(1) among the inorganic oxyacids: sulfurous, sulfuric, hypophosphorous, phosphorous, orthophosphoric or pyrophosphoric acids;

(2) among the organic oxyacids:

(i) the organosulfonic acids of the formula $R_1—SO_3H$ (I), in which $R_1$ denotes: a straight-chain or branched alkyl radical containing from 1 to 6 carbon atoms; a phenyl radical optionally substituted by 1 to 3 alkyl radicals containing from 1 to 3 carbon atoms; a phenylalkyl radical containing from 1 to 3 carbon atoms in the alkyl moiety and in which the benzene nucleus may optionally be substituted by 1 to 3 alkyl radicals containing from 1 to 3 carbon atoms, or a naphthyl radical optionally substituted by 1 to 4 alkyl radicals containing from 1 to 3 carbon atoms;

(ii) the organophosphonic acids of the formula $R_2—P(O)(OH)_2$ (II), in which $R_2$ denotes an alkyl radical, a phenyl radical or a phenylalkyl radical, each of these radicals having the definition given above for $R_1$;

(iii) the organophosphinic acids of the formula $R_3R_4—P(O)(OH)$ (III), in which $R_3$ and $R_4$, which are identical or different, each denote: a straight-chain alkyl radical containing from 1 to 3 carbon atoms; a phenyl radical or a phenylalkyl radical, each of the latter two radicals having the definition given above for $R_1$;

(iv) the organophosphonous acids of the formula $R_5H—P(O)(OH)$ (IV), in which $R_5$ denotes: a straight-chain or branched alkyl radical containing from 1 to 4 carbon atoms (the branching being excluded for an alkyl radical containing 4 carbon atoms); a phenyl radical or a phenylalkyl radical, each of the latter two radicals having the definition given above for $R_1$.

As a strong acid (alpha), it is preferred to use the acids derived from phosphorus, and more particularly the hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous or benzylphosphonous acids.

Where the acid salt (beta) is concerned, use is generally made of alkali or alkaline earth metal salts derived from inorganic or organic oxyacids (alpha).

Salts which are completely soluble in the reaction mixture are preferably used as the salt (beta). Among these preferred salts (beta), the sodium and potassium salts derived from the particular suitable types of inorganic or organic oxyacids (alpha), referred to above, are very suitable. The salts (beta) which are especially suitable are sodium and potassium salts originating from the preferred phosphorus-derived acids referred to by name above.

The proportions of strong acid (alpha) or salt (beta), expressed as a weight percentage relative to the final copolyamide, generally range from 0.01 to 1%, and preferably from 0.01 to 0.5%. In addition to a catalytic action during the polycondensation reaction, the strong acids (alpha) or their salts (beta), and especially the phosphorus-derived compounds of this type, have the advantage of providing the final copolyamide with some protection against degradation due to light.

If good operation of the process according to the present invention is to be ensured, care will be taken to observe the corresponding proportions of the various constituents employed as perfectly as possible. In a preferred embodiment of the invention, in step (a) the short-chain diacid(s) is (or are) used in the form of its (or of their) salt(s) with hexamethylenediamine [variant (ii)]. In order to ensure, on the other hand, stoichiometry in the production of the salt(s) of short-chain acid(s) with hexamethylenediamine and, on the other hand, the stoichiometry or the intended stoichiometric excess between free hexamethylenediamine and the dimer acid, the operation may be carried out by precise weighing of the reactants (the assay of which is known accurately at the time of use). The stoichiometry of the salt(s) of the short-chain acid(s) can be monitored by measuring the pH of specimen solutions produced by diluting the salt(s) in a suitable solvent. It is also possible to monitor the stoichiometry or the intended stoichiometric excess in the amidification reaction between the free amino groups in the prepolymer and the dimer acid, by control of the viscosity which may be advantageously assessed by in situ measurement of the resistant torque of mechanical stirring of the polycondensation mixture in step (b).

To carry out the process according to the invention, hexamethylenediamine may be used in solid form, in melt form, or in the form of an aqueous solution. The salt(s) of short-chain acid(s) and hexamethylenediamine may also be used in solid form, in melt form or in the form of an aqueous solution.

Concerning step (a) of the process according to the invention, the operation is preferably carried out in a closed system under an autogenous water vapor pressure which is above atmospheric pressure and does not exceed 2 MPa. It will be appreciated that the autogenous water vapor pressure which is required to conduct the distillation is produced by gradual heating, for example, over a period of time ranging from 10 minutes to 2 hours, up to a temperature ranging from 150° to 220° C.

As regards step (b) of the process according to the present invention, which follows step (a), carried out in the preferred manner as indicated above, this operation is preferably carried out by linking the following steps:

(1) either all of the dimer acid, or a part of the dimer acid representing, for example, 70 to 95% of the total amount to be introduced into the polymer, is added gradually, for example, over a period of time ranging from 10 minutes to 2 hours,
while the pressure is at the same time reduced from the initial prepolymerization value down to the value of atmospheric pressure,
while the temperature of the reaction mixture is also raised for the same period of time to a value above the temperature reached at the end of step (a) and lying in the range of from 250° to 280° C.,
and while ensuring simultaneous distillation of water;

(2) when the aforesaid addition of dimer acid is completed, after stirring of the reaction mixture has continued, if appropriate, at the aforementioned temperature and at atmospheric pressure for a period of time ranging, for example, from 10 minutes to 1 hour, a reduced pressure not exceeding $200 \cdot 10^2$ Pa is then gradually established over a period of time ranging, for example, from 5 minutes to 1 hour; and (3) when the reduced pressure has been established, the remainder of the dimer acid is added where applicable and the polycondensation is completed by continuing to stir the mixture at the aforementioned temperature which lies in the range of from 250° to 280° C., at the reduced pressure indicated above, for a period of time ranging, for example, from 10 minutes to 1 hour, while simultaneously ensuring a distillation of residual water.

In the case where step (a) is carried out under an autogenous pressure above atmospheric pressure, it may be advantageous, when this pressure is close (or equal) to the maximum value of the pressure indicated above in the present description, to carry out, before introducing all or part of the dimer acid, a slight pressure reduction which reduces the autogenous water vapor pressure to a value $p_1$ which is from 5 to 30% lower than the prepolymerization pressure. It should then be understood, within the scope of the preferred application of the step (b) referred to above, that all or part of the dimer acid is added gradually while the pressure is reduced at the same time, no longer from the initial prepolymerization value, but from the value $p_1$ down to the value of atmospheric pressure.

It is possible to add to the mixture for preparing the copolyamides according to this invention, without inconvenience, one or more additives such as especially: stabilizers or inhibitors of degradation due to oxidation, to ultraviolet, to light or heat; lubricants; colorants; nucleating agents; antifoaming agents and inorganic fillers.

The process according to the invention enables production of homogenous copolyamides which have good thermal resistance and mechanical strength due to their high melting points and an improved flexibility at the same time. Being perfectly homogeneous, they have improved transparency properties and may be used in the usual injection-molding, extrusion or spinning methods to provide shaped articles: components, films or fibers of very high uniformity.

In order to further illustrate the present invention and the advantages thereof, the following specific examples are given, it being understood that same are intended only as illustrative and in nowise limitative.

A number of controls were carried out in these examples. Similarly, various properties were measured. The operating methods and/or the standards according to which these controls and measurements were carried out are indicated below.

(I) MICROCALORIMETRIC ANALYSIS

The polymers were characterized by melting characteristics such as the melting endotherms Em and the crystallization exotherms Ec.

These determinations were carried out using a specimen subjected to temperature variations of 10° C./minute both upwards and downwards. In this manner, a differential microcalorimetry curve was determined, on which it was possible to observe the melting (Tm) and crystallization on cooling (Tc) points.

(II) MELT VISCOSITY

This was measured at 260° C. under a variable shear gradient (indicated in the examples below) with the aid of a Davenport rheometer. The results are expressed in poises.

(III) DETERMINATION OF THE END GROUPS IN THE COPOLYAMIDE

The method described below made it possible to estimate both types of end groups on a single test sample and with a single acidimetric titration. The polyamide was dissolved with stirring in a mixture of trifluoroethanol and chloroform at ambient temperature. After it had dissolved, a 0.05N aqueous alcoholic solution of tetrabutylammonium hydroxide was added and a potentiometric titration was finally carried out using a standardized solution of 0.05N hydrochloric acid under a stream of nitrogen. The use of the potentiometric curve exhibiting two potential steps enabled the two types of end groups to be determined.

(IV) DETERMINATION OF TENSILE MECHANICAL PROPERTIES

These were determined at 25° C. on specimens conditioned at an RH of 0 according to the French Standard NF T 51 034 (in an Instron-type tensometer at a traction speed of 10 mm/min). Conditioning at an RH of 0: the specimens were placed over silica gel in a desiccator and were dried for 24 hours at ambient temperature at 0.66 to $1.33 \cdot 10^2$ Pa before the measurements were carried out.

(V) TORSIONAL MODULUS

This was determined at several temperatures ($-20°$ C., 0° C., $+20°$ C., $+40°$ C., $+60°$ C.) with an automatic torsion pendulum at a frequency on the order of 1 hertz in accordance with the standard ISO R 537. The specimens were conditioned at an RH of 0. The results are expressed in Mpa.

In the following examples, wherever reference is made to the dimer acid employed, the compound used was that marketed by Unichema Chemie under the trademark Pripol 1010, in which the difunctional acid fraction was greater than 95% by weight. This difunctional acid fraction consisted of a mixture of isomers containing 36 carbon atoms, in which the predominant species was a saturated compound of the formula:

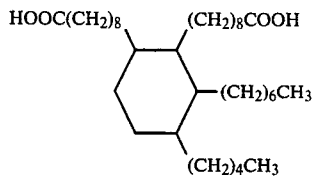

The monofunctional acid fraction (the weight proportion of which will be detailed later) consisted substantially of oleic acid; as for the fraction of acid with a functionality greater than 2 (the weight proportion of which will also be detailed later), this consisted substantially of a mixture of isomeric trimers containing 54 carbon atoms; the mean molecular weight of this dimer acid was on the order of 571.

EXAMPLE 1

The operation was carried out in a 7.5 liter stainless steel autoclave fitted with mechanical stirring, a heating system and a system which made it possible to operate at a pressure above atmospheric pressure, or at a pressure below atmospheric pressure.

Step (a):
The following charges were introduced into the apparatus at ambient temperature:
(i) hexamethylenediamine salt of adipic acid, in dry solid form: 2,086.7 g (7.955 moles);
(ii) demineralized water: 700 g;
(iii) aqueous solution containing 32.5% by weight of hexamethylenediamine: 746.5 g (2.088 moles);
(iv) aqueous solution containing 50% by weight of hypophosphorous acid: 6 g; and
(v) silicone antifoam marketed by Rhone-Poulenc Specialites Chimiques under the trademark Rhodorsil Si 454: 0.3 g.

Stirring was commenced and five nitrogen purges were carried out by pressurization to $7 \cdot 10^5$ Pa, followed by pressure release. The temperature of the stirred mixture was gradually raised to 217° C. over 1 hour, 15 minutes, while the autogenous pressure was maintained; this reached 1.8 MPa. Water was distilled off under pressure over 2 hours to attain a mixture temperature of 250° C.

Step (b):
The pressure was released down to 1.5 MPa while the temperature was maintained at 250° C. 885 g (1.567 moles) of fatty acid dimer marketed by Unichema Chemie under the trademark Pripol 1010, having a monomer content of 0.03% by weight and a trimer content of 3% by weight were then added to the stirred mixture by steady pouring over 1 hour, 35 minutes; during the time when the dimer acid was being added, the autoclave pressure was gradually reduced to atmospheric pressure and the temperature of the mixture was gradually raised to 270° C.

A pressure of $133 \cdot 10^2$ Pa was then gradually established over 40 minutes, while the mixture was maintained at 270° C. When the reduced pressure had been established, an additional 90 g (0.158 mole) of dimer acid were added by steady pouring. The polycondensation was completed by continuing to stir the mixture for 30 minutes at 270° C. under $133 \cdot 10^2$ Pa.

Stirring was stopped, and then a nitrogen pressure of $5 \cdot 10^5$ Pa was established in the autoclave and the polymer was drawn off. The latter, extruded from the autoclave in lace form, was cooled by passing same through a cold water bath, and it was then granulated and dried.

The polymer obtained was perfectly transparent and consequently homogeneous. It had the following characteristics, measured on dry granules:
(1) Melting point (Tm): 241° C.,
(2) Crystallization point on cooling (Tc): 191° C.,
(3) End group contents:
COOH: 1.75 meq/kg
NH$_2$: 116.4 meq/kg
(4) Melt viscosity at 260° C. under a shear gradient:
$\gamma = 18.6$ s$^{-1}$: 6,000 poises.
(5) Tensile mechanical properties:
Break strength: 64.3 MPa,
Elongation at break: 270%,
Tensile modulus: 750 MPa,
(6) Torsional thermomechanical properties; torsional modulus at:
$-20°$ C.: 600 MPa,
0° C.: 570 MPa,
$+20°$ C.: 500 MPa,
$+40°$ C.: 320 MPa,
$+60°$ C.: 125 MPa.

EXAMPLE 2

The operation was carried out in a 7.5 liter stainless steel autoclave equipped as stated in Example 1.

Step (a):

The following charges were introduced into the apparatus at ambient temperature:
(i) hexamethylenediamine salt of adipic acid, in dry solid form: 1,043.3 g (3.978 moles);
(ii) aqueous solution containing 32.15% by weight of hexamethylenediamine: 1,424 g (3.939 moles);
(iii) aqueous solution containing 50% by weight of hypophosphorous acid: 6 g; and
(iv) silicone antifoam described above in Example 1: 0.3 g.

Stirring was commenced and five nitrogen purges were carried out by pressurization to 1 MPa, followed by pressure release. The temperature of the stirred mixture was raised gradually to 217° C. over 1 hour, while autogenous pressure was maintained. This reached 1.8 MPa. Water was distilled off under pressure over 1 hour, such that the mixture attained a temperature of 230° C.

Step (b):

Pressure was reduced to 1.5 MPa while the temperature was maintained at 230° C. 1,566 g (2.743 moles) of Pripol 1010 fatty acid dimer described earlier in Example 1 were then added to the stirred mixture by steady pouring over 1 hours, 30 minutes; during the time when the dimer acid was being added, the autoclave pressure was gradually reduced to atmospheric pressure and the temperature of the mixture was gradually raised to 260° C. The mixture was stirred for 30 minutes at 260° C. at atmospheric pressure.

A pressure of $133 \cdot 10^2$ Pa was then established gradually over 30 minutes while the mixture was maintained at 260° C. When the reduced pressure had been established, an additional 220 g (0.385 mole) of dimer acid were added by steady pouring. The polycondensation was completed by continuing to stir the mixture for 30 minutes at 260° C. under $133 \cdot 10^2$ Pa.

Stirring was stopped, and then a nitrogen pressure of $5 \cdot 10^5$ Pa was established in the autoclave and the polymer was drawn off. The latter, extruded from the autoclave in lace form, was cooled by passing same through a cold water bath and it was then granulated and dried.

The polymer obtained was perfectly transparent and consequently homogeneous. It had the following characteristics, measured on dry granules:
(1) Melting point (Tm): 214° C.,
(2) Crystallization point on cooling (Tc): 145° C.,
(3) End group contents:
COOH: 54.48 meq/kg,
$NH^2$: 9.47 meq/kg,
(4) Melt viscosity at 260° C. under a shear gradient: $\gamma = 10$ s$^{-1}$: 4,000 poises.
(5) Torsional mechanical properties:
Break strength: 49.7 MPa,
Elongation at break: 300%,
Tensile modulua: 325 MPa.
(6) Torsional thermomechanical properties; torsional modulus at:
−20° C.: 470 MPa,
0° C.: 400 MPa,
+20° C.: 235 MPa,
+40° C.: 100 MPa.

By way of a comparative test, the above example was reproduced, but this time without the use of catalyst (hypophosphorous acid); the reactant charges were as follows:

Step (a):
(i) hexamethylenediamine salt of adipic acid, in dry solid form: 1,043.3 g (3.978 moles),
(ii) aqueous solution containing 32.15% by weight of hexamethylenediamine: 1,244.8 g (3.450 moles),
(iii) silicone antifoam Si 454: 0.3 g.

Step (b):
(i) first addition of dimer acid: 1,716 g (3.005 moles),
(ii) second addition of dimer acid: 126 g (0.220 mole).

The polymer obtained was perfectly transparent and consequently homogeneous. But the end group contents which were obtained, namely:
COOH: 68.5 meq/kg,
$NH_2$: 55 meq/kg
were high, and this result is indicative of a slowing down of the polycondensation in the absence of hypophosphorous acid. It was noted, furthermore, that the melt viscosity, measured at 260° C., under a gradient $\gamma = 10$ s$^{-1}$, was low, being on the order of 900 poises.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a homogeneous, high melting, flexible copolyamide, comprising (a) prepolymerizing either (i) mixture of adipic acid and hexamethylenediamine, or admixture thereof with at least one other short-chain dicarboxylic acid, or (ii) mixture of (1) a salt of adipic acid, or salt of admixture of adipic acid with at least one other short-chain dicarboxylic acid, and hexamethylenediamine, together with (2) free hexamethylenediamine, said prepolymerization (a) being carried out in the presence of a catalytically effective amount of a strong inorganic oxyacid, or strong organic oxyacid other than a carboxylic acid, or alkali or alkaline earth metal salt thereof, said resulting prepolymer having amino end groups, and thence (b) polycondensing said prepolymer with a fatty acid dimer.

2. The process as defined by claim 1, wherein the amount of short-chain acid(s) to the total amount of short-chain acid(s)+dimer acid ranges from 50 to 99 mole %.

3. The process as defined by claim 2, said prepolymerization (a) being carried out in the presence of water.

4. The process as defined by claims 2 or 3, said oxyacid catalyst having a plurality of acid functions, at least one of which having an ionization constant pKa, in water at 25° C., not exceeding 4.

5. The process as defined by claims 2 or 3, wherein said step (a) the prepolymerization reaction mixture is gradually heated to an autogenous water vapor pressure ranging from atmospheric to 3 megapascals, and the water present is distilled therefrom and the temperature of the reaction mass adjusted to from 170° to 250° C.

6. The process as defined by claim 5, wherein said step (b) polycondensation is carried out at a temperature ranging from 250° to 280° C., at a water vapor pressure gradually decreasing from the prepolymerization pressure established in step (a), to atmospheric or less than atmospheric pressure.

7. The process as defined by claim 6, wherein said step (a) the mixture (i) is prepolymerized, and the ratio $r_1$ of the number of moles of hexamethylenediamine relative to the total number of moles of short-chain carboxylic acid(s) and of dimer acid is either 1, or a value greater than stoichiometric such as to provide an excess of hexamethylenediamine.

8. The process as defined by claim 6, wherein said step (a) the mixture (ii) is prepolymerized, and the ratio $r_2$ of the number of moles of free hexamethylenediamine relative to the number of moles of dimer acid is either 1, or a value greater than stoichiometric such as to provide an excess of hexamethylenediamine.

9. The process as defined by claim 6, wherein said short-chain dicarboxylic acid comprises at least one of 1,4-cyclohexanedicarboxylic acid, isophthalic acid, or terephthalic acid, the proportion of adipic acid in said mixture of adipic acid and short-chain dicarboxylic acid being at least 70 mole %.

10. The process as defined by claim 6, said dimer acid being obtained by polymerization and fractionation of compounds comprising 80 to 100% by weight of monomeric fatty acid(s) containing from 16 to 20 carbon atoms and 20 to 0% by weight of monomeric fatty acid(s) containing from 8 to 15 carbon atoms, from 21 to 24 carbon atoms, or a mixture thereof, and said dimer acid comprising a difunctional acid fraction greater than 94% by weight, a monofunctional acid fraction less than 1% by weight, and a fraction of acid having a functionality greater than 2 of less than 5% by weight.

11. The process as defined by claim 10, said dimer acid being obtained by fractionation of a hydrogenated composition originating from the catalytic polymerization of monomeric fatty acid(s) containing 18 carbon atoms.

12. The process as defined by claim 6, said oxyacid catalyst comprising sulfurous, sulfuric, hypophosphorous, phosphorous, orthophosphoric, or pyrophosphoric acid; an organosulfonic acid having the formula $R_1$—$SO_3H$ (I), in which $R_1$ is a straight or branched chain alkyl radical containing from 1 to 6 carbon atoms, an unsubstituted phenyl radical, a phenyl radical substituted by 1 to 3 alkyl radicals containing from 1 to 3 carbon atoms, a phenylalkyl radical containing from 1 to 3 carbon atoms in the alkyl moiety and the benzene nucleus of which is unsubstituted or substituted by 1 to 3 alkyl radicals containing from 1 to 3 carbon atoms, or a naphthyl radical, or a naphthyl radical substituted by 1 to 4 alkyl radicals containing from 1 to 3 carbon atoms; an organophosphonic acid having the formula $R_2$—$P(O)(OH)_2$ (II), in which $R_2$ is an alkyl, phenyl or phenylalkyl radical as defined under $R_1$; an organophosphinic acid having the formula $R_3R_4$—$P(O)(OH)$ (III), in which $R_3$ and $R_4$, which are identical or different, are each a straight-chain alkyl radical containing from 1 to 3 carbon atoms, or a phenyl radical or a phenylalkyl radical as defined under $R_1$; or an organophosphonous acid having the formula $R_5H$—$P(O)(OH)$ (IV), in which $R_5$ is a straight-chain or branched alkyl radical containing from 1 to 4 carbon atoms, or a phenyl radical or a phenylalkyl radical as defined under $R_1$.

13. The process as defined by claim 12, said oxyacid catalyst comprising hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous, or benzylphosphonous acid.

14. The process as defined by claim 12, said catalyst comprising the sodium or potassium salt of such oxyacids.

15. The process as defined by claim 6, wherein the amount of said oxyacid or salt catalyst, expressed as a weight percentage relative to the final copolyamide, ranges from 0.01 to 1%.

16. The process as defined by claim 6, wherein said step (a) is carried out in a closed system under autogenous water vapor pressure which is greater than atmospheric pressure and does not exceed 2 megapascals.

17. The process as defined by claim 16, wherein said step (b) either all of the dimer acid, or a part of the dimer acid representing 70 to 95% of the total amount to be introduced into the polymer, is gradually added, over a period of time ranging from 10 minutes to 2 hours, the pressure is reduced at the same time from the initial prepolymerization value down to atmospheric pressure, the temperature of the reaction mixture is also raised for the same period of time to a value above the temperature attained upon completion of step (a) and ranging from 250° to 280° C., and water is simultaneously distilled therefrom.

18. The process as defined by claim 17, wherein, after the dimer acid has been gradually added and the reaction mixture continuously stirred a reduced pressure not exceeding $200 \cdot 10^2$ pascals is then gradually established over a period of time ranging from 5 minutes to 1 hour, and when the reduced pressure has been established any of the dimer acid remaining is added and the polycondensation is completed by continuing to stir the mixture at the aforementioned temperature and reduced pressure, for a period of time ranging from 10 minutes to 1 hour, while simultaneously distilling residual water.

19. The copolyamide product of the process as defined by claim 1, wherein the acid component in step (a) comprises either (i) a mixture of adipic acid with at least one other short-chain dicarboxylic acid or (ii) a salt of admixture of adipic acid with at least one other short-chain dicarboxylic acid.

20. The copolyamide product of the process as defined by claim 19, wherein said other short-chain dicarboxylic acid, or salt thereof, comprises at least one of 1,4-cyclohexanedicarboxylic acid, isophthalic acid and terephthalic acid, the proportion of adipic acid in the mixture of short-chain diacids being at least 70 mole %.

21. The process as defined by claim 18, wherein prior to reducing the pressure to a pressure not exceeding $200 \cdot 10^2$ pascals the reaction mixture is stirred at the pre-established temperature and pressure for a period of time ranging from 10 minutes to 1 hour.

* * * * *